(12) United States Patent
Ibarra

(10) Patent No.: US 6,490,823 B1
(45) Date of Patent: Dec. 10, 2002

(54) FISHING AND CAMPING APPARATUS

(76) Inventor: Tim V. Ibarra, 8605 Albury St., Bakersfield, CA (US) 93313

( * ) Notice: Subject to any disclaimer, the term of this patent is extended or adjusted under 35 U.S.C. 154(b) by 0 days.

(21) Appl. No.: 10/029,351

(22) Filed: Dec. 20, 2001

(51) Int. Cl.[7] ................................................. A01K 97/10
(52) U.S. Cl. ..................... 43/21.2; 248/512; 248/514; 248/523; 248/530; 248/533
(58) Field of Search ........................ 43/21.2; 248/512, 248/514, 521, 523, 530, 533; D22/147, 148

(56) References Cited

U.S. PATENT DOCUMENTS

| | | | | |
|---|---|---|---|---|
| 2,311,823 A | * | 2/1943 | Gaskill, Sr. ................... | 43/21.2 |
| 2,704,412 A | * | 3/1955 | Davis .......................... | 43/21.2 |
| D179,525 S | | 1/1957 | Porter | |
| 2,877,828 A | * | 3/1959 | Barnette, Jr. ................ | 248/533 |
| 3,225,656 A | * | 12/1965 | Flaherty ..................... | D22/147 |
| 3,344,551 A | * | 10/1967 | Chestnut .................... | 43/21.2 |
| 3,602,466 A | * | 8/1971 | Drowns ...................... | 248/514 |
| 3,628,759 A | * | 12/1971 | Knedlik et al. ............ | D22/147 |
| 4,095,364 A | | 6/1978 | Prine | |
| 4,235,409 A | | 11/1980 | Cummings | |
| 4,372,072 A | | 2/1983 | Comeau | |
| 4,497,129 A | * | 2/1985 | Chestnut .................... | 43/21.2 |
| 4,611,427 A | | 9/1986 | Coutcher | |
| 4,650,146 A | * | 3/1987 | Duke ......................... | 43/21.2 |
| 4,676,019 A | | 6/1987 | Engles | |
| 4,700,502 A | * | 10/1987 | McFarland et al. .......... | 43/21.2 |
| 4,730,408 A | | 3/1988 | Miller | |
| 4,782,624 A | * | 11/1988 | Head ......................... | 43/21.2 |
| 4,866,873 A | * | 9/1989 | Van Valkenburg ........... | 43/21.2 |
| 4,938,446 A | * | 7/1990 | Williams .................... | 43/21.2 |
| 5,058,308 A | * | 10/1991 | Girard ........................ | 43/21.2 |
| 5,187,891 A | * | 2/1993 | Stanishewski .............. | 43/21.2 |
| D337,808 S | * | 7/1993 | Parker ........................ | D22/147 |
| D344,321 S | | 2/1994 | DeWitt | |
| 5,323,991 A | * | 6/1994 | West .......................... | 43/21.2 |
| 5,359,802 A | | 11/1994 | Gutierrez | |
| 5,383,299 A | * | 1/1995 | Smelker ..................... | 43/21.2 |
| 5,560,137 A | * | 10/1996 | Herring ...................... | 43/21.2 |
| D375,996 S | * | 11/1996 | Weatherman .............. | D22/147 |
| 5,685,107 A | * | 11/1997 | Sweet ........................ | 43/21.2 |
| 5,692,720 A | * | 12/1997 | Griggs ....................... | 248/530 |
| D394,300 S | * | 5/1998 | Samuels et al. ........... | D22/147 |
| 5,873,192 A | * | 2/1999 | Chiu .......................... | 43/21.2 |
| D431,277 S | | 9/2000 | Mitchell | |
| 6,227,845 B1 | * | 5/2001 | Pillow et al. ............... | 248/530 |
| D448,446 S | | 9/2001 | Walls | |
| D448,447 S | | 9/2001 | Sheppard | |

FOREIGN PATENT DOCUMENTS

| | | | | |
|---|---|---|---|---|
| DE | 29519969 B1 | * | 7/1996 | |
| DE | 19707904 B1 | * | 9/1998 | |
| GB | 2232567 B1 | * | 12/1990 | |
| GB | 2306092 B1 | * | 4/1997 | |
| JP | 2-13339 B1 | * | 1/1990 | |
| JP | 7-289136 B1 | * | 11/1995 | |
| JP | 11-155452 B1 | * | 6/1999 | |

* cited by examiner

*Primary Examiner*—Darren W. Ark
(74) *Attorney, Agent, or Firm*—James M. Duncan

(57) ABSTRACT

The disclosed apparatus is a fishing rod holding apparatus which is capable of holding, singularly or in combination, a fishing pole, an umbrella, and a lantern. The device is easily transportable because it easily disassembles into small and easy to handle component parts. The device incorporates a swivel, so the fishing rod may be swung about for baiting the hook, unhooking a catch, or adjusting the tackle.

9 Claims, 3 Drawing Sheets

FISHING AND CAMPING APPARATUS

BACKGROUND OF THE INVENTION

The present invention generally relates to devices used to assist and enhance the sport of fishing, and more particularly to devices which are configured to hold a fishing rod, where the device is secured to the ground surface. The device is further adapted to hold other fishing and camping equipment, such as a lantern, an umbrella, or other fishing and camping gear.

When fishing from a shoreline, it is often desirable for the fisherman to cast his line and then set the fishing pole in a holder anchored in the ground so that the fisherman is free for other activities. A number of devices which perform this function are known, each having various advantages and disadvantages. Among the desired features of these devices are that the device should allow for the rapid and easy insertion of the fishing rod and the device should be easily transported, i.e., the device should be easy to disassemble and be relatively light. It would also be advantageous if the device would allow for the pole to be pivoted from pointing towards the water to some other direction away from the water, thereby allowing the fisherman to leave the pole within the holder while the fisherman is either rebaiting his hook, unhooking his catch, or making other adjustments to his fishing equipment.

Fishermen have been known to enjoy their sport at all times of day and night, and in all types of weather. If he fishes in the very early morning or late into the night, the fisherman requires a light source and a location to place the light source for effective lighting. Fuel burning lanterns provide a steady and relatively inexpensive source of bright light. A fishing rod holder having the further capability of holding a lantern would be desirable. Because fishermen also fish in both bright sunlight and rainy weather, it would be advantageous to have a fishing rod holder also capable of holding a sheltering device such as an umbrella. It would also be advantageous to have a device which is capable of holding any combination of a fishing pole, umbrella and/or lantern, separately or together.

SUMMARY OF THE INVENTION

The present invention is directed to an apparatus which meets the need identified above.

The disclosed apparatus is a fishing rod holding apparatus, comprising a ground penetrating anchor, a pole holding member, an extension tube, and an extension rod. The ground penetrating anchor comprises first an inverted L-shaped rod having a substantially vertical first member and a substantially horizontal second member, the first member having a lower end and an upper end, the lower end sharpened for penetrating the ground, and the second member having a proximal end and a distal end, the proximal end connected to the upper end of the first member. The ground penetrating anchor further comprises a sleeve insert having a top and a bottom, wherein the bottom is attached to the upper end of the first member such that the axis of the sleeve insert is substantially parallel to the first member, and the top extends above the upper end. The pole holding member comprises a first sleeve adapted to receive and retain a fishing rod handle, a second sleeve adapted to slide over the sleeve insert of the anchor and stop at the bottom of the sleeve insert, leaving the top of the sleeve insert exposed, and a connecting arm having a rod end and an anchor end, the rod end connected to the first sleeve and the anchor end connected to the second sleeve. The second sleeve is free to pivot on the sleeve insert, thereby allowing the pole holding member to swivel a complete circle with respect to the ground penetrating anchor, thereby allowing the user to swivel a fishing rod from pointing toward a water body to some other orientation. The extension tube is adapted to slide over the top of the sleeve insert and the extension rod has an insert end adapted to slide inside the extension tube. At its opposing end, the extension rod has a hook adapted to receive and retain a lantern handle. The disclosed device further comprises a first locking means for locking the extension tube to the top of the sleeve insert and a second locking means for locking the extension rod within the extension tube at a desired position. When not locked, the extension rod is free to slide within the extension tube so the height of the hook may be set as desired.

In a second embodiment, the disclosed fishing rod holding apparatus further comprises a handle holder attached to the distal end of the horizontal second member, where the handle holder is adapted to receive and retain an umbrella handle. A third locking means for locking the umbrella handle into the handle holder may be also be included.

DETAILED DESCRIPTION OF THE EMBODIMENTS

Figure 1:
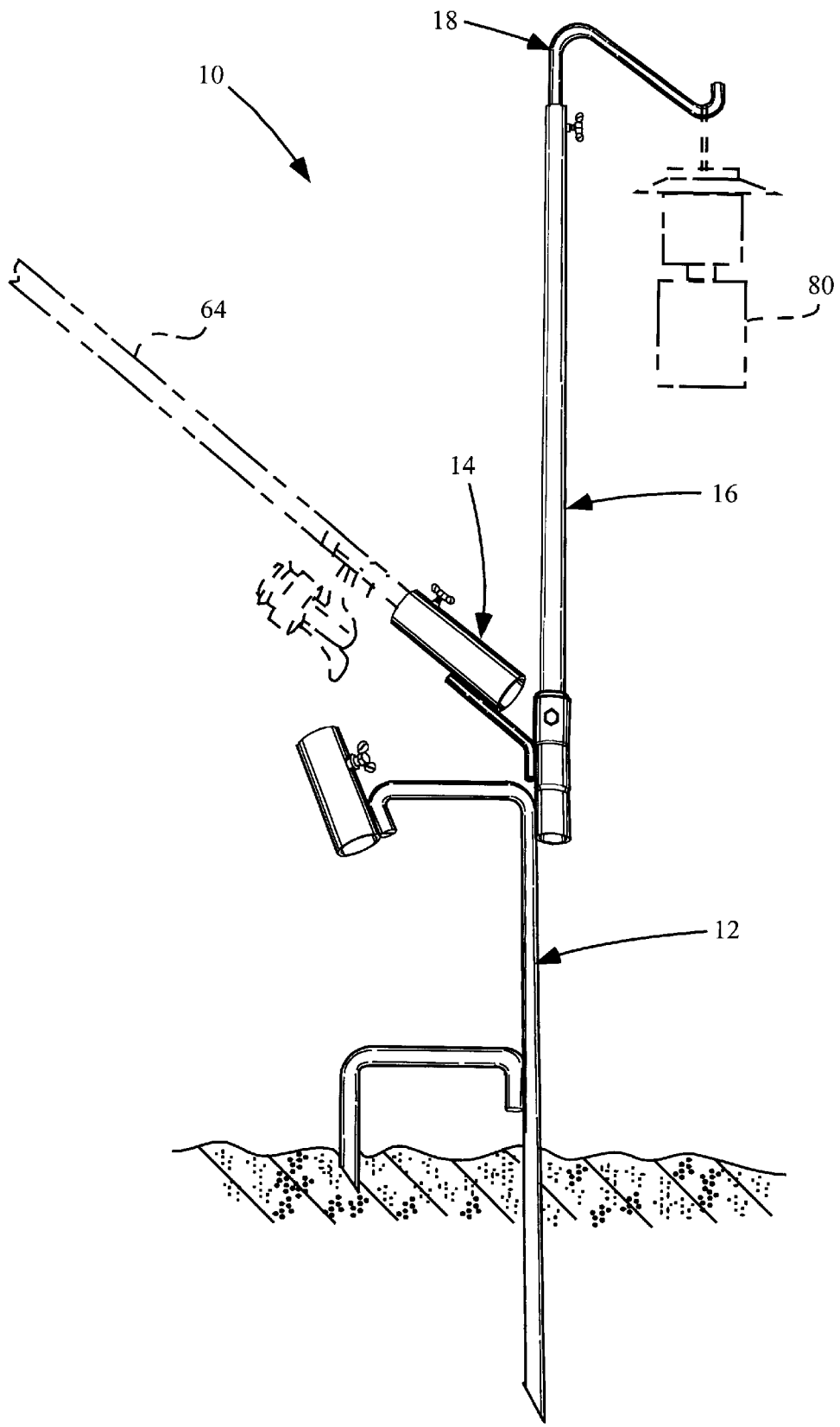
FIG. 1 is a side view of the disclosed fishing and camping apparatus being used to hold a fishing pole and a lantern.
Figure 2:
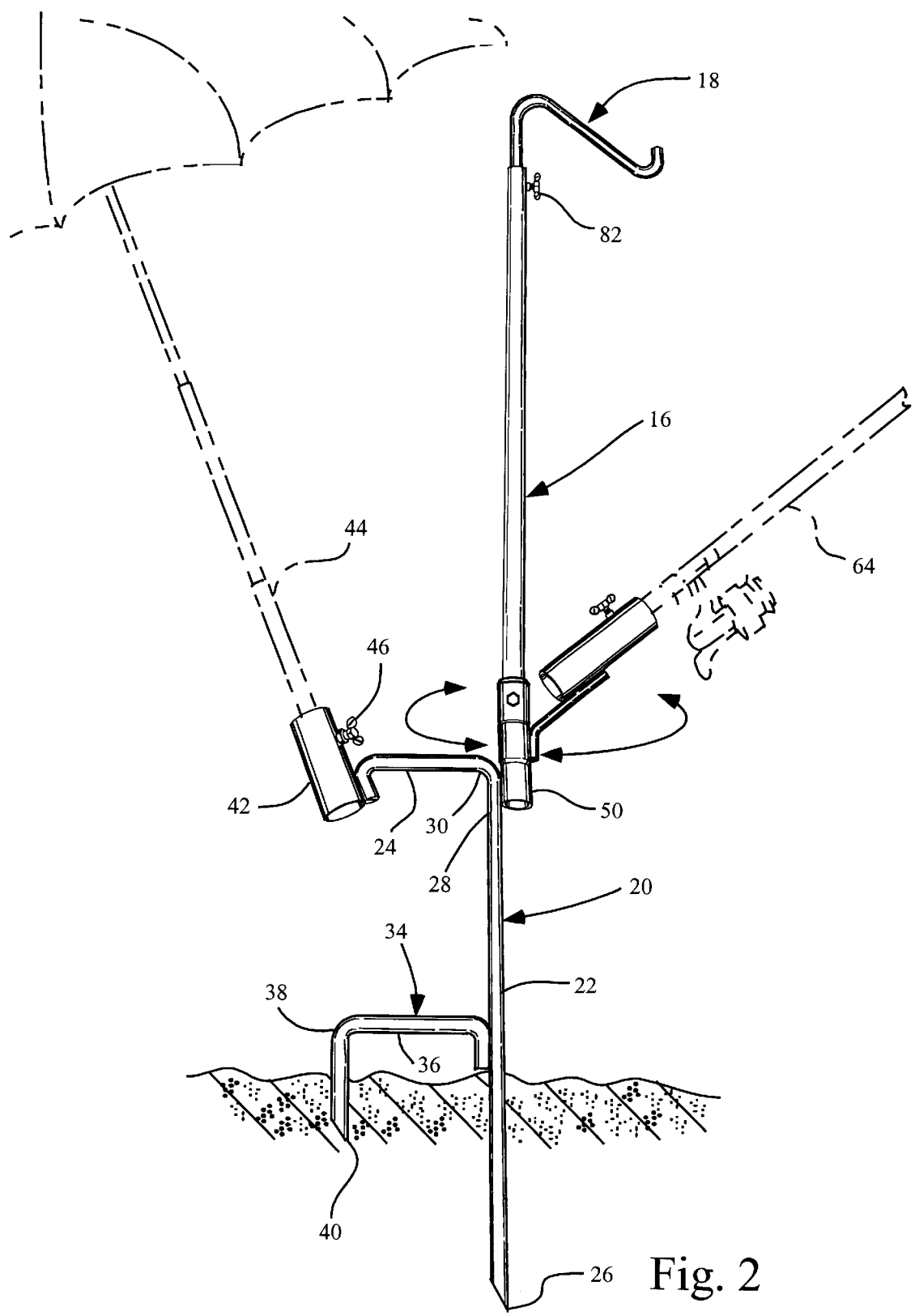
FIG. 2 is a side view of the disclosed apparatus being used to hold a fishing pole and an umbrella.
Figure 3:
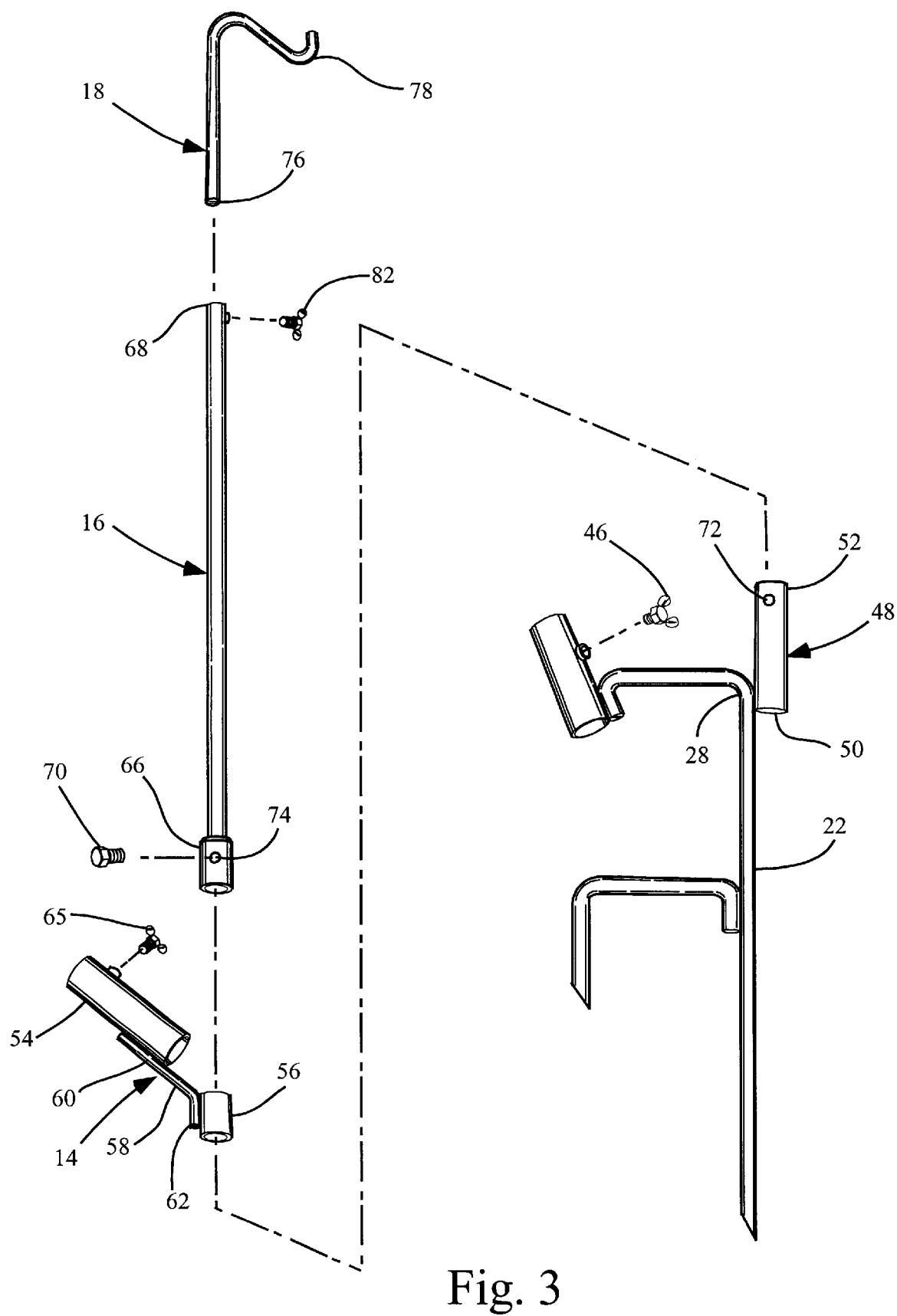
FIG. 3 shows an exploded view of the disclosed apparatus.

Referring now specifically to the drawings, FIG. 1 shows the disclosed fishing and camping apparatus 10. The major components of the device are the ground penetrating anchor 12, the pole holding member 14, extension tube 16 and extension rod 18.

The ground penetrating anchor 12 comprises an inverted L-shaped rod 20 having a substantially vertical first member 22 and a substantially horizontal second member 24. The first member 22 has a lower end 26 and an upper end 28. The lower end 26 is sharpened to allow the user to set the anchor 12 into the ground. The second member 24 has a proximal end 30 which is attached to the upper end 28 of the first member 22. The second member 24 also has a distal end 32. The second member 24 provides a convenient place for the user to place his or her foot to push the anchor 12 into the ground. Alternatively, the anchor may further comprise a foot bar 34 which may have a substantially horizontal first leg 36, to which is attached a substantially vertical second leg 38. The tip 40 of the vertical second leg 38 may be sharpened to allow further ease in inserting the second leg 38 into the ground.

The ground penetrating anchor 12 may further comprise a handle holder 42, which may be attached to the distal end 32 of the second member 24. Handle holder 42 is adapted to receive and retain an umbrella 44. The umbrella 44 may be additionally secured with locking means (third locking means) 46, such as a bolt having a winged head, for tightening down on the umbrella handle. It is to be appreciated that a ground penetrating anchor 12 equipped with the handle holder 42 makes a convenient umbrella stand, even if the other components described below are not attached to the apparatus, thus providing an apparatus for standing an umbrella as a sun screen or shelter at the beach, athletic field, or camp site.

A round sleeve insert 48 is attached at its bottom 50 to the upper end 28 of the first member 22. The sleeve insert 48 also has a top 52. The bottom 50 is attached to the upper end 28 such that the axis of the sleeve insert 48 is substantially parallel to the first member 22. The top 52 of the sleeve insert 48 extends above the upper end 28, so that the entire diameter of the top 52 of the sleeve insert 48 is exposed preferably including two or more inches of the length of the sleeve insert 48, measured from the top 52.

The pole holding member 14 comprises a first sleeve 54, a second sleeve 56, and a connecting arm 58 having a pole end 60 and an anchor end 62. The pole end 60 is attached to the first sleeve 54 and the anchor end 62 is attached to the second sleeve 56. The first sleeve 54 is adapted to easily receive the handle of a fishing pole 64. The first sleeve 54 may be equipped with locking means (fourth locking means) 65, such as a finger-adjustable bolt for tightening against the fishing rod handle for securing the fishing pole 64 within the sleeve. The second sleeve 56 is adapted to slide over the top 52 of the sleeve insert 48. The sleeve insert 48 and the second sleeve 56 are sized so that the top 52 of the sleeve insert 48 remains exposed after the second sleeve 56 is slid onto the slide insert 48. The second sleeve 56 pivots freely about the sleeve insert 48 allowing the pole holding member 14 to rotate a complete 360 degrees with respect to the axis of the sleeve insert 48. This feature of the pole holding member 14 allows the user to orient their fishing pole in any direction without removing the pole 64 from the device, thereby facilitating baiting the hook, attaching a lure, or removing a catch.

Extension tube 16 has sleeve end 66 and hook end 68. Sleeve end 66 slides over the top 52 of the sleeve insert 48, above second sleeve 56. Locking means (first locking means) 70 secure the extension tube 16 to the top 52 of the sleeve insert. The sleeve insert 48 may have a first hole 72 and the sleeve end 66 may have a second holes 74 which align with the first hole 72 when the sleeve end 66 of the extension tube 16 is slid over the sleeve insert 48. The locking means 70 may then comprise a bolt extending through the second holes 74 and through first hole 72 of the sleeve insert 48, the bolt secured with a nut.

Extension rod 18 has an insert end 76 and hook 78. Insert end 76 is adapted to slide inside hook end 68 of the extension tube 16. Hook 78 is adapted to receive and retain the handle of a conventional lantern 80. Extension rod 18 is free to telescope inside extension tube 16, so that the lantern 80 might be set at the desired height. Once the desired height is determined, locking means (second locking means) 82 are used to secure extension rod 18 within the extension tube 16. Extension tube 16 may have a first threaded opening so that locking means 82 may comprise a bolt extending into the first threaded opening and engaging the extension rod 18.

It is to be appreciated that if the user is using the disclosed device 10 during the day time and no lantern 80 required, the disclosed device may be used without extension tube 16 and extension rod 18. The disclosed device is therefore adaptable for use in a variety of configurations. First, the ground penetrating anchor 12 may be used by itself as an umbrella stand. Second, the pole holding member 14 may be attached to the ground penetrating anchor so that the apparatus may be used for holding a fishing pole 64 alone, or for holding both a fishing pole and an umbrella 44. Third, if the extension tube 16 and extension rod 18 are attached, the device may be used solely as a lantern stand, as a combination umbrella stand-lantern stand, a combination fishing pole holder and lantern stand or for simultaneously holding a fishing pole, lantern and umbrella. Therefore, the disclosed apparatus provides multiple utility in a simple and easily transportable form, which is relatively inexpensive to construct. The ground penetrating anchor 12, the pole holding member 14, extension tube 16 and extension rod 18 may be constructed of a variety of materials, including heavy gauge metal, alloys, composites, or high strength plastic.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A fishing rod holding apparatus, comprising:
   (a) a ground penetrating anchor comprising:
      (i) an inverted L-shaped rod having a substantially vertical first member and a substantially horizontal second member, the first member having a lower end and an upper end, the lower end sharpened for penetrating the ground, and the second member having a proximal end and a distal end, the proximal end connected to the upper end of the first member; and
      (ii) a sleeve insert having a top and a bottom, wherein the bottom is attached to the upper end of the first member such that the axis of the sleeve insert is substantially parallel to the first member, and the top extends above the upper end;
   (b) a pole holding member, comprising:
      (i) a first sleeve adapted to receive and retain a fishing rod handle;
      (ii) a second sleeve adapted to slide over the sleeve insert of the anchor and stop at the bottom of the sleeve insert, leaving the top of the sleeve insert exposed; and
      (iii) a connecting arm having a rod end and an anchor end, the rod end connected to the first sleeve and the anchor end connected to the second sleeve;
   (c) an extension tube adapted to slide over the top of the sleeve insert;
   (d) an extension rod having an insert end and a hook, the insert end adapted to slide inside the extension tube and the hook adapted to receive and retain a lantern handle;
   (e) a first locking means for locking the extension tube to the top of the sleeve insert; and
   (f) a second locking means for locking the extension rod within the extension tube at a desired position.

2. A fishing rod holding apparatus, comprising:
   (a) a ground penetrating anchor comprising:
      (i) an inverted L-shaped rod having a substantially vertical first member and a substantially horizontal second member, the first member having a lower end and an upper end, the lower end sharpened for penetrating the ground, and the second member having a proximal end and a distal end, the proximal end connected to the upper end of the first member;
      (ii) a handle holder attached to the distal end of the horizontal second member, the handle holder adapted to receive and retain an umbrella handle; and
      (iii) a sleeve insert having a top and a bottom, wherein the bottom is attached to the upper end of the first member such that the axis of the sleeve insert is substantially parallel to the first member, and the top extends above the upper end;

(b) a pole holding member, comprising:
  (i) a first sleeve adapted to receive and retain a fishing rod handle;
  (ii) a second sleeve adapted to slide over the sleeve insert of the anchor and stop at the bottom of the sleeve insert, leaving the top of the sleeve insert exposed; and
  (iii) a connecting arm having a rod end and an anchor end, the rod end connected to the first sleeve and the anchor end connected to the second sleeve;
(c) an extension tube adapted to slide over the top of the sleeve insert;
(d) an extension rod having an insert end and a hook, the insert end adapted to slide inside the extension tube and the hook adapted to receive and retain a lantern handle;
(e) a first locking means for locking the extension tube to the top of the sleeve insert;
(f) a second locking means for locking the extension rod within the extension tube at a desired position; and
(g) a third locking means for locking the umbrella handle into the handle holder.

3. The fishing rod holding apparatus of claim 2, wherein the sleeve insert has a first hole and the extension tube has a second hole aligned with the first hole of the sleeve insert and the first locking means comprises a first bolt extending through the first hole in the sleeve insert and the second hole of the extension tube and a first nut is attached to the first bolt.

4. The fishing rod apparatus of claim 2 wherein the extension tube has a first threaded opening and the second locking means comprises a second bolt extending into the first threaded opening, the second bolt engaging the extension rod.

5. The fishing rod apparatus of claim 2 wherein the handle holder has a second threaded opening and the third locking means comprises a third bolt extending into the second threaded opening, the third bolt engageable with the umbrella handle.

6. The fishing rod apparatus of claim 2 further comprising a fourth locking means for locking the fishing rod handle into the first sleeve.

7. The fishing rod holding apparatus of claim 2, further comprising a foot bar attached to the first member between the lower end and the upper end.

8. The fishing rod holding apparatus of claim 7, wherein the foot bar has a substantially horizontal first leg and a substantially vertical second leg, where the second leg is attached to the first leg.

9. A fishing rod holding apparatus, comprising:
(a) a ground penetrating anchor comprising:
  (i) an inverted L-shaped rod having a substantially vertical first member and a substantially horizontal second member, the first member having a lower end and an upper end, the lower end sharpened for penetrating the ground, and the second member having a proximal end and a distal end, the proximal end connected to the upper end of the first member;
  (ii) a handle holder attached to the distal end of the horizontal second member, the handle holder adapted to receive and retain an umbrella handle; and
  (iii) a sleeve insert having a top and a bottom, wherein the bottom is attached to the upper end of the first member such that the axis of the sleeve insert is substantially parallel to the first member, and the top extends above the upper end;
(b) a pole holding member, comprising:
  (i) a first sleeve adapted to receive and retain a fishing rod handle;
  (ii) a second sleeve adapted to slide over the sleeve insert of the anchor and stop at the bottom of the sleeve insert, leaving the top of the sleeve insert exposed; and
  (iii) a connecting arm having a rod end and an anchor end, the rod end connected to the first sleeve and the anchor end connected to the second sleeve;
(c) an extension tube adapted to slide over the top of the sleeve insert;
(d) an extension rod having an insert end and a hook, the insert end adapted to slide inside the extension tube and the hook adapted to receive and retain a lantern handle;
(e) a first locking means for locking the extension tube to the top of the sleeve insert;
(f) a second locking means for locking the extension rod within the extension tube at a desired position;
(g) a third locking means for locking the umbrella handle into the handle holder;
(h) a fourth locking means for locking the fishing rod handle into the first sleeve; and
(i) a foot bar attached to the first member between the lower end and the upper end, the foot bar having a substantially vertical first leg and a substantially horizontal second leg, where the second leg is attached to the first leg.

* * * * *